(12) United States Patent
Grigoriev et al.

(10) Patent No.: US 11,961,205 B2
(45) Date of Patent: Apr. 16, 2024

(54) IMAGE RESYNTHESIS USING FORWARD WARPING, GAP DISCRIMINATORS, AND COORDINATE-BASED INPAINTING

(71) Applicant: Samsung Electronics Co., Ltd., Suwon-si (KR)

(72) Inventors: Artur Andreevich Grigoriev, Moscow (RU); Victor Sergeevich Lempitsky, Moscow (RU); Artem Mikhailovich Sevastopolsky, Moscow (RU); Alexander Timurovich Vakhitov, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 309 days.

(21) Appl. No.: 17/282,214

(22) PCT Filed: Nov. 7, 2019

(86) PCT No.: PCT/KR2019/015051
§ 371 (c)(1),
(2) Date: Apr. 1, 2021

(87) PCT Pub. No.: WO2020/096368
PCT Pub. Date: May 14, 2020

(65) Prior Publication Data
US 2021/0334935 A1    Oct. 28, 2021

(30) Foreign Application Priority Data

Nov. 9, 2018 (RU) ................................ 2018139543
Apr. 29, 2019 (RU) ................................ 2019113117

(51) Int. Cl.
*G06K 9/00* (2022.01)
*G06N 3/045* (2023.01)
(Continued)

(52) U.S. Cl.
CPC ............... *G06T 3/18* (2024.01); *G06N 3/045* (2023.01); *G06N 3/08* (2013.01); *G06T 5/77* (2024.01);
(Continued)

(58) Field of Classification Search
None
See application file for complete search history.

(56) References Cited

U.S. PATENT DOCUMENTS 6,434,280 B1    8/2002 Peleg et al.
9,299,133 B2    3/2016 Minezawa et al.
(Continued)

FOREIGN PATENT DOCUMENTS

CN    108564119 A  *  9/2018   ......... G06K 9/00342
RU    2 648 578 C1    3/2018

OTHER PUBLICATIONS

Jantet et al., Joint projection filling method for occlusion handling in Depth-Image-Based Rendering, XP 055127661, Dec. 1, 2011.
(Continued)

*Primary Examiner* — Xin Jia
(74) *Attorney, Agent, or Firm* — Jefferson IP Law, LLP (57) ABSTRACT

An image resynthesis system, a system for training a gap filling module to be used in the image resynthesis system, an image resynthesis method, a computer program product, and a computer-readable medium are provided. The image resynthesis system comprises a source image input module, a forward warping module predicting, for each source image pixel of a source image, a corresponding position in a target image, and predicting a forward warping field which is aligned with the source image, and a gap filling module filling in gaps resulting from application of the forward warping module.

10 Claims, 4 Drawing Sheets

(51) Int. Cl.
     *G06N 3/08*    (2023.01)
     *G06T 3/18*    (2024.01)
     *G06T 5/77*    (2024.01)

(52) U.S. Cl.
     CPC ............... *G06T 2207/20081* (2013.01); *G06T 2207/20084* (2013.01)

(56) References Cited

U.S. PATENT DOCUMENTS

| | | | |
|---|---|---|---|
| 9,414,073 | B2 | 8/2016 | Minezawa et al. |
| 9,898,856 | B2* | 2/2018 | Yang .................. G06T 5/006 |
| 10,540,757 | B1* | 1/2020 | Bouhnik ............... G06T 7/37 |
| 2004/0156556 | A1* | 8/2004 | Lopez .................. G06T 3/0093 345/647 |
| 2006/0133688 | A1 | 6/2006 | Kang et al. |
| 2010/0157078 | A1 | 6/2010 | Atanassov et al. |
| 2011/0157408 | A1 | 6/2011 | Steinberg et al. |
| 2014/0119595 | A1 | 5/2014 | Gallo et al. |
| 2014/0270544 | A1* | 9/2014 | Chiang ................ G06T 7/12 382/215 |
| 2017/0064280 | A1 | 3/2017 | Cho et al. |
| 2017/0308990 | A1 | 10/2017 | Middleton et al. |
| 2018/0060688 | A1* | 3/2018 | Worthington ......... G06F 18/40 |
| 2018/0158199 | A1* | 6/2018 | Wang .................... G06T 7/33 |
| 2018/0234671 | A1 | 8/2018 | Yang et al. |

OTHER PUBLICATIONS

Extended European Search Report dated Oct. 5, 2021, issued in European Patent Application No. 19881010.3.
Russian Decision on Grant dated Apr. 29, 2020, issued in Russian Patent Application No. 2019113117.
Neverova et al.; Dense Pose Transfer; Computer Vision Foundation (CVF); European Conference on Computer Vision (ECCV); 15th European Conference; Sep. 8-14, 2018; Munich, Germany.
Russian Office Action dated Jan. 20, 2019, issued in Russian Patent Application No. 2019113117.
Russian Decision on Grant dated Jul. 30, 2019, issued in Russian Patent Application No. 2019113117.
Blanz et al.; Face Recognition Based on Fitting a 3D Morphable Model; IEEE Transactions on Pattern Analysis and Machine Intelligence; vol. 25, No. 9; IEEE Computer Society; Sep. 2003; Germany.
Cao et al.; Load Balanced GANs for Multi-view Face Image Synthesis; National Laboratory of Pattern Recognition, CASIA; Center for Research on Intelligent Perception and Computing, CASIA; Center for Excellence in Brain Science and Intelligence Technology, CAS; University of Chinese Academy of Sciences, Beijing, 100049, China; Noah's Ark Lab of Huawei Technologies; arXiv:1802.07447v1 [cs.CV]; Feb. 21, 2018.
Cao et al.; Learning a High Fidelity Pose Invariant Model for High-resolution Face Frontalization; National Laboratory of Pattern Recognition, CASIA; Center for Research on Intelligent Perception and Computing, CASIA; Center for Excellence in Brain Science and Intelligence Technology, CAS; University of Chinese Academy of Sciences, Beijing, 100049, China; arXiv:1806.08472v1 [cs.CV]; Jun. 22, 2018.
Deng et al.; UV-GAN: Adversarial Facial UV Map Completion for Pose-invariant Face Recognition; Imperial College London; Dec. 13, 2017.
Ganin et al; Deepwarp: Photorealistic Image Resynthesis for Gaze Manipulation; European Conference on Computer Vision; Skolkovo Institute of Science and Technology; arXiv:1607.07215v1 [cs.CV]; Jul. 25, 2016.
Goodfellow et al; Generative Adversarial Nets; Advances in Neural Information Processing Systems; Département d'informatique et de recherche opérationnelle; Université de Montréal; Montréal, QC H3C 3J7; pp. 2672-2680; 2014.

Gross et al.; Multi-PIE; NIH Public Access Author Manuscript; Proc Int Conf Autom Face Gesture Recognit. Author manuscript; available in PMC May 1, 20109; Proc Int Conf Autom Face Gesture Recognit. May 1, 2010; 28(5): 807-813. doi:10.1016/j.imavis. 2009.08.002; Image and Vision Computing; May 19, 2010.
Guler; DensePose: Dense Human Pose Estimation in the Wild; In the IEEE Conference on Computer Vision and Pattern Recognition (CVPR); arXiv:1802.00434v1 [cs.CV]; Feb. 1, 2018.
Hu et al; Pose-Guided Photorealistic Face Rotation; Computer Vision Foundation; 2018 IEEE/CVF Conference on Computer Vision and Pattern Recognition (CVPR); Jun. 2018.
Huang et al.; Beyond Face Rotation: Global and Local Perception GAN for Photorealistic and Identity Preserving Frontal View Synthesis; National Laboratory of Pattern Recognition, CASIA; Center for Research on Intelligent Perception and Computing, CASIA; University of Chinese Academy of Sciences, Beijing, China; arXiv:1704.04086v2 [cs.CV]; Aug. 4, 2017.
Iizuka et a; Globally and Locally Consistent Image Completion; ACM Transactions on Graphics (TOG); vol. 36, No. 4, Article 107; Publication date: Jul. 2017.
Isola et al; Image-to-Image Translation with Conditional Adversarial Networks; Computer Vision Foundation; CVPR; Berkeley AI Research (BAIR) Laboratory, UC Berkeley; Nov. 22, 2017.
Jaderberg et al.; Spatial Transformer Networks; NIPS; Google DeepMind, London, UK; arXiv:1506.02025v1 [cs.CV]; Jun. 5, 2015.
Johnson et al.; Perceptual Losses for Real-Time Style Transfer and Super-Resolution; ECCV; arXiv:1603.08155v1 [cs.CV]; Mar. 27, 2016.
Lecun et al.; Backpropagation Applied to Handwritten Zip Code Recognition; Neural Computation; Massachusetts Institute of Technology; Dec. 1989.
Li et al; Generative Face Completion; University of California, Merced; Adobe Research; arXiv:1704.05838v1 [cs.CV]; CVPR, vol. 1; Apr. 19, 2017.
Liu et al.; Image Inpainting for Irregular Holes Using Partial Convolutions; NVIDIA Corporation; arXiv:1804.07723v1 [cs.CV]; Apr. 20, 2018.
Liu et al.; DeepFashion: Powering Robust Clothes Recognition and Retrieval with Rich Annotations; The Chinese University of Hong Kong; SenseTime Group Limited; Shenzhen Institutes of Advanced Technology, IEEE Conference on Computer Vision and Pattern Recognition (CVPR) 2016.
Neverova et al; Dense Pose Transfer; Computer Vision Foundation (CVF); European Conference on Computer Vision (ECCV); 1arXiv:1809.01995v1 [cs.CV]; Sep. 6, 2018.
Park et al.; Transformation-Grounded Image Generation Network for Novel 3D View Synthesis; University of North Carolina at Chapel Hill; Adobe Research; arXiv:1703.02921v1 [cs.CV]; CVPR; IEEE; Mar. 8, 2017.
Ren et al.; Shepard Convolutional Neural Networks; NIPS; 2015.
Ronneberger et al.; U-Net: Convolutional Networks for Biomedical Image Segmentation; MICCAI; Computer Science Department and BIOSS Centre for Biological Signalling Studies, University of Freiburg, Germany; arXiv:1505.04597v1 [cs.CV]; May 18, 2015.
Siarohin et al.; Deformable GANs for Pose-based Human Image Generation; DISI, University of Trento, Italy; Inria Grenoble Rhone-Alpes, France; IEEE Conference on Computer Vision and Pattern Recognition (CVPR); arXiv:1801.00055v2 [cs.CV]; Apr. 6, 2018.
Tulyakov et al.; MoCoGAN: Decomposing Motion and Content for Video Generation; IEEE Conference on Computer Vision and Pattern Recognition (CVPR); 2018.
Uhrig et al.; Sparsity Invariant CNNs; International Conference on 3D Vision (3DV); IEEE 2017; arXiv:1708.06500v2 [cs.CV]; Sep. 1, 2017.
Yim et al.; Rotating Your Face Using Multi-task Deep Neural Network; CVPR 2015; Computer Vision Foundation; pp. 676-684; 2015.
Yin et al.; Towards Large-Pose Face Frontalization in the Wild; ICCV; arXiv:1704.06244v1 [cs.CV]; Apr. 20, 2017.
Yu et al.; Free-Form Image Inpainting with Gated Convolution; arXiv:1806.03589v1 [cs.CV]; Jun. 10, 2018.

(56) References Cited

OTHER PUBLICATIONS

Zhao et al.; Dual-Agent GANs for Photorealistic and Identity Preserving Profile Face Synthesis; 31st Conference on Neural Information Processing Systems, NIPS; 2017, Long Beach, CA, USA.

Zhou et al.; View Synthesis by Appearance Flow; ECCV; University of California, Berkeley; arXiv:1605.03557v1 [cs.CV]; May 11, 2016.

* cited by examiner

IMAGE RESYNTHESIS USING FORWARD WARPING, GAP DISCRIMINATORS, AND COORDINATE-BASED INPAINTING

CROSS-REFERENCE TO RELATED APPLICATION(S)

This application is a U.S. National Stage application under 35 U.S.C. § 371 of an International application number PCT/KR2019/015051, filed on Nov. 7, 2019, which is based on and claims priority of a Russian patent application number 2018139543, filed on Nov. 9, 2018, in the Russian Intellectual Property Office, and of a Russian patent application number 2019113117, filed on Apr. 29, 2019, in the Russian Intellectual Property Office, the disclosure of each of which is incorporated by reference herein in its entirety.

TECHNICAL FIELD

The present invention generally relates to image processing and, more specifically, to image resynthesis for synthesizing new views of a person or an object based on an input image using machine learning techniques.

BACKGROUND ART

Recently, there has been a growing interest to learning-based image resynthesis. In this context, the task of machine learning is to learn to synthesize new views e.g., of a person or an object of a certain type based on one or more input images of the person or the object. In an extreme case, only one input view is available. In this sense, a new view corresponds to a new camera position and/or a new body pose of a person. In image resynthesis, one measures the quality of the target view, and does not care for the quality of intermediate representation, which often implicitly or explicitly corresponds to a model of the scene (e.g., a three dimensional (3D) reconstruction). Optimizing for the target view quality directly often means that the target view quality is higher especially when scene modeling is hard.

Several trends are discerned. Firstly, dealing with a hard prediction problem which accompanies image resynthesis necessitates deep convolutional networks (ConvNets) (see [15]). Secondly, many prior art solutions avoid predicting pixel values directly from a high-dimensional non-convolutional representation. Instead, most architectures resort to some sort of warping inside the ConvNet (see e.g., [5, 30, 20, 3, 23]). Notoriously, in many cases prior art uses backward warping [13], where, for each pixel in the target image, a location in the source image is predicted, from which the pixel will be copied. The warping process is often followed by a post-processing such as brightness correction (see [5]) or post-processing networks.

Several approaches to the problems related to the objective technical problem to be solved by the present invention will now be discussed.

Warping-based resynthesis. There is a strong interest in using deep convolutional networks for generating realistic images (see e.g., [6]). When new images are generated by changing geometry and appearance of input images, it has been shown that using warping modules greatly enhances the quality of the re-synthesized images (see e.g., [5, 30]). In this case, the warping modules are based on differentiable (backward) grid sampler layer, which was first introduced as a part of Spatial Transformer Networks (STN) (see e.g., [13]).

Adversarial image inpainting. There are also prior art solutions aimed at image inpainting based on deep convolutional networks. Special variants of convolutional architectures adapted to the presence of gaps in the input data include Shepard convolutional neural networks (see e.g., [21]), sparsity-invariant convolutional networks (see e.g., [25]), networks with partial convolutions (see e.g., [17]), networks with gated convolutions (see e.g., [28]). The latter variant is also used in the approach that is suggested in the present disclosure.

As inpainting tasks necessitate conditional synthesis of image content, state-of-the-art approaches to inpainting rely heavily on variants of generative adversarial learning (see e.g., [6]). In particular, prior art suggests using pairs of discriminators that focus on the discrimination between real and fake examples at two different scales (see e.g., [16, 11, 28, 4]), where one of the scales can correspond to individual patches (resembling the patch GAN idea from [12]). Here, a new type of discriminator is introduced, which has similar architecture to some of the local discriminators and to patch GAN, however discriminates between two different classes of pixels (known pixels in fake images vs. unknown pixels, also in fake images).

Face frontalization. Prior art solutions that concentrate on image resynthesis (such as generating new views and/or changing poses for 3D objects based on a single input photographic image or multiple input photographic images) use images of faces as the primary domain. A frontalized face view can be used as a normalized representation in order to simplify face recognition and to enhance its quality. Several state-of-the-art solutions use a backward sampler for this task. For example, an HF-PIM system, which may be regarded as the most typical example of such an approach, predicts a cylindrical texture map and a backward warping field required to transform a texture map to a frontalized facial view. The result of the warping is then refined by another network. Many other methods which are currently considered to be highly effective, such as CAPG-GAN (see e.g., [9]) LB-GAN (see e.g., [2]), CPF (see e.g., [26]), FF-GAN (see e.g., [27]), are based on encoder-decoder networks directly performing a desired transformation by representing an image in a low-dimensional latent space. Additionally, a resynthesis network is typically trained in GAN setting to make output face look realistic and prevent various kinds of artifacts. Many of these methods employ additional information such as landmarks (see e.g., [9, 29]), local patches (see e.g., [10]), 3D Morphable Model (3DMM, see e.g., [1]) estimation (see e.g., [27]). Such additional information can then be used either to condition the resynthesis process or to formulate additional losses by measuring, to which extent the synthesized image conforms with available additional information.

Warping-based full body resynthesis. In the prior art, warping is utilized in order to synthesize new views of a person given a single input view (see e.g., [24, 23, 19]). This approach also utilizes dense-pose parameterization (see e.g., [8]) within the network to represent the target pose of a person on a resynthesized image.

It should be noted that all above-mentioned types of prior art approaches to image resynthesis have certain drawbacks, and the present invention is aimed at eliminating or at least mitigating at least some of the drawbacks of the prior art. In particular, shortcomings of available prior art solutions are related to the use of backward warping in image resynthesis where, for each pixel in the target image, a location in the source image is predicted, from which the pixel will be copied.

DISCLOSURE

Technical Problem

The object of the present invention consists in providing a new method for image resynthesis that eliminates or at least mitigates all or at least some of the above-mentioned drawbacks of existing prior art solutions.

The technical result achieved by the present invention consists in improved accuracy of image resynthesis for synthesizing new views of a person or an object based on at least one input image.

Technical Solution

In one aspect, this object is achieved by an image resynthesis system comprising: a source image input module; a forward warping module configured to predict, for each source image pixel, a corresponding position in a target image, the forward warping module being configured to predict a forward warping field which is aligned with the source image; and a gap filling module configured to fill in the gaps resulting from the application of the forward warping module.

In an embodiment, the gap filling module may further comprise a warping error correction module configured to correct forward warping errors in the target image.

Advantageous Effects

The image resynthesis system may further comprise a texture transfer architecture configured to: predict warping fields for the source image and the target image; map the source image into a texture space via forward warping, restore the texture space into a whole texture; and map the whole texture back to a new pose using backward warping.

The image resynthesis system may further comprise a texture extraction module configured to extract texture from the source image. At least the forward warping module and the gap filling module may be implemented as deep convolutional neural networks.

In an embodiment, the gap filling module may comprise a gap inpainter, the gap inpainter comprising: a coordinate assignment module configured to assign, to each pixel p=(x,y) of the input image, a pair of texture coordinates (u,v) according to a fixed pre-defined texture mapping, so as to provide a two-channel map of x and y values in the texture coordinate frame; a texture map completion module configured to provide a complete texture map, where for each texture pixel (u,v) a corresponding image pixel (x[u,v],y[u,v]) is known; a final texture generating module configured to generate a final texture by mapping image values from positions (x[u,v],y[u,v]) onto the texture at positions (u,v) so as to provide a complete color final texture; a final texture remapping module configured to remap the final texture to a new view by providing a different mapping from the image pixel coordinates to the texture coordinates.

At least one of the deep convolutional networks may be trained using a real/fake discriminator configured to discriminate ground truth images and inpainted images. The image resynthesis system may further comprise an image refinement module configured to correct output image defects.

In another aspect, a system for training a gap filling module configured to fill in gaps as part of image resynthesis is provided, the system being configured to train the gap filling module in parallel and jointly with a gap discriminator network, whereas the gap discriminator network is trained to predict a binary mask of gaps, and the gap filling module is trained to minimize the accuracy the gap discriminator network.

In yet another aspect, the invention relates to an image resynthesis method comprising the steps of: inputting a source image; predicting, for each source image pixel, a corresponding position in a target image, wherein a forward warping field which is aligned with the source image is predicted; predicting a binary mask of gaps which result from the forward warping, filling in the gaps based on said binary mask of gaps by generating a texture image by means of predicting a pair of coordinates in the source image for each pixel in the texture image; and mapping the whole texture back to a new pose using backward warping.

In an embodiment, the step of filling in the gaps may comprise the steps of: assigning, to each pixel p=(x,y) of the input image, a pair of texture coordinates (u,v) according to a fixed pre-defined texture mapping, so as to provide a two-channel map of x and y values in the texture coordinate frame; providing a complete texture map, where for each texture pixel (u,v) a corresponding image pixel (x[u,v],y[u,v]) is known; generating a final texture by mapping image values from positions (x[u,v],y[u,v]) onto the texture at positions (u,v) so as to provide a complete color final texture; remapping the final texture to a new view by providing a different mapping from the image pixel coordinates to the texture coordinates.

In yet another aspect, the invention provides a method for training a gap filling module configured to fill in gaps as part of image resynthesis, the method comprising training the gap filling module in parallel and jointly with a gap discriminator network, whereas the gap discriminator network is trained to predict a binary mask of gaps, and the gap filling module is trained to minimize the accuracy the gap discriminator network.

In yet another aspect, a computer program product comprising computer program code which, when executed by one or more processors, causes the one or more processors to implement the method of the second aforementioned aspect is provided.

In yet another aspect, a non-transitory computer-readable medium having stored thereon the computer program product according to the above-mentioned aspect is provided.

From reading and understanding of the specification provided below it would be appreciated by ones skilled in the art that the claimed invention may also take other forms. Various method steps and system components may be implemented by hardware, software, firmware means or any suitable combination thereof.

DESCRIPTION OF DRAWINGS

Following the summary of invention presented above, a detailed description of the inventive concept is provided below by way of an example and with reference to the accompanying drawings, which are provided merely as an illustration and are not intended to limit the scope of the claimed invention or determine its essential features. In the drawings:

BEST MODE

This detailed description is provided to facilitate the understanding of the essence of the invention. It is noted that the description is directed to exemplary embodiments of the invention, and other modifications, variations and equivalent substitutions in the described subject matter may occur to a person skilled in the art from careful reading of the description with reference to the accompanying drawings. All such apparent modifications, variations and equivalents are deemed covered by the scope of the claimed invention. No reference numerals or signs provided in this detailed description as well as in the appended claims are intended to limit or determine the scope of the claimed invention in any way.

The present invention suggests a new approach for image resynthesis based on at least one input image. The inventive systems and methods are based on various neural networks with the capability of training on various data sets, such as deep convolutional neural networks. It may be apparent for a person skilled in the art that the implementations of the present invention are not limited to the neural networks specifically described herein, but may be realized using other types of networks which may be suitable for a given task within the context of the present invention. The neural networks suitable for implementing the present inventions may be realized by material and technical means well known to persons skilled in the art such as, but not limited to, one or more processors, general purpose or specialized computers, graphics processing units (GPUs) etc. controlled by one or more computer programs, computer program elements, program code etc. so as to implement the inventive methodologies described hereinbelow.

First, the claimed invention will now be described in terms of one or more machine learning models based on the deep convolutional neural networks pre-trained or being trained to perform the specified processing which results in image resynthesis for synthesizing new views of a person or an object based on at least one input image.

In summary, the suggested approach is based on two contributions as compared to the state-of-the art. As the first contribution, a resynthesis architecture based on forward warping is suggested. The warping process employed inside the warping stages of the prior art approaches outlined above is redesigned, in particular by replacing backward warping widely used in the prior art with forward warping provided by a module that predicts the corresponding position in the target image for every source image pixel. The present inventors have found that predicting a forward warping field from a source image is an easier task, since the forward warping field is aligned with the source image. This is in contrast to backward warping field, which is spatially aligned with the target image and is not spatially-aligned with the source image. The presence of spatial alignment between the source image and the forward warping field makes prediction mapping easier to learn for a convolutional architecture.

However, the results of forward warping contain gaps that need to be filled. Most prior art solutions approach the problem of gap inpainting using adversarial architectures. Hence, the second contribution of the proposed invention is a new type of gap discriminator that is specific to the inpainting tasks. Gap discriminators are only trained on "fake" (i.e., inpainted) images and do not require "real" images. For each fake image, a gap discriminator is trained to predict the binary mask of the gaps that were provided to the inpainting network. Consequently, training against a gap discriminator causes inpainting networks to fill in the gaps in a way that makes the gaps imperceptible.

Suggested two contributions are not independent but rather complement each other, forming the new resynthesis approach which has been evaluated by the present inventors for several tasks such as face frontalization and full-body resynthesis.

Also suggested is the new methodology for full-body resynthesis. In this methodology, body texture coordinates are estimated using the so-called DensePose approach. The texture is completed using a deep convolutional network. The deep convolutional network can even be used to predict the color of unknown pixels. Alternatively, a deep network is used that predicts, for each pixel in the texture image, the pair of coordinates in the source image (coordinate-based inpainting). The latter scheme (coordinate-based inpainting) gives a much sharper texture. The completed texture is used to generate a new view of a full body given the body surface coordinates for each foreground pixel in the target image. Optionally, another deep network can be used to generate the final target image taking the produced image with a superimposed texture and some other images as an input.

In accordance with the first aspect, the present invention provides an image resynthesis system comprising:
  a source image input module;
  a forward warping module; and
  a gap filling module.

The gap filling module further comprises a warping error correction module configured to correct forward warping errors in the target image. The forward warping module is configured to predict, for each source image pixel, a corresponding position in a target image, the forward warping module being configured to predict a forward warping field which is aligned with the source image. The gap filling module is configured to fill in the gaps resulting from the application of the forward warping module.

In an embodiment, the image resynthesis system further comprises a texture transfer architecture configured to: predict warping fields for the source image and the target image; map the source image into a texture space via forward warping, restore the texture space into a whole texture; and map the whole texture back to a new pose using backward warping.

In an exemplary embodiment, the image resynthesis system further comprises a texture extraction module configured to extract texture from the source image. At least the forward warping module and the gap filling module may be implemented as deep convolutional neural networks. At least one of these deep convolutional networks is trained using a real/fake discriminator configured to discriminate ground truth images and inpainted images.

In an embodiment, the gap filling module comprises a gap inpainter, which, in turn, may be composed at least of:

a coordinate assignment module configured to assign, to each pixel p=(x,y) of the input image, a pair of texture coordinates (u,v) according to a fixed pre-defined texture mapping, so as to provide a two-channel map of x and y values in the texture coordinate frame;

a texture map completion module configured to provide a complete texture map, where for each texture pixel (u,v) a corresponding image pixel (x[u,v],y[u,v]) is known;

a final texture generating module configured to generate a final texture by mapping image values from positions (x[u,v],y[u,v]) onto the texture at positions (u,v) so as to provide a complete color final texture; and a final texture remapping module configured to remap the final texture to a new view by providing a different mapping from the image pixel coordinates to the texture coordinates.

In an embodiment, the image resynthesis system further comprises an image refinement module configured to correct output image defects.

In another aspect of the present invention, a system for training the gap filling module is provided. The system is configured to train the gap filling module in parallel and jointly with a gap discriminator network, whereas the gap discriminator network is trained to predict a binary mask of gaps, and the gap filling module is trained to minimize the accuracy the gap discriminator network.

Figure 7:
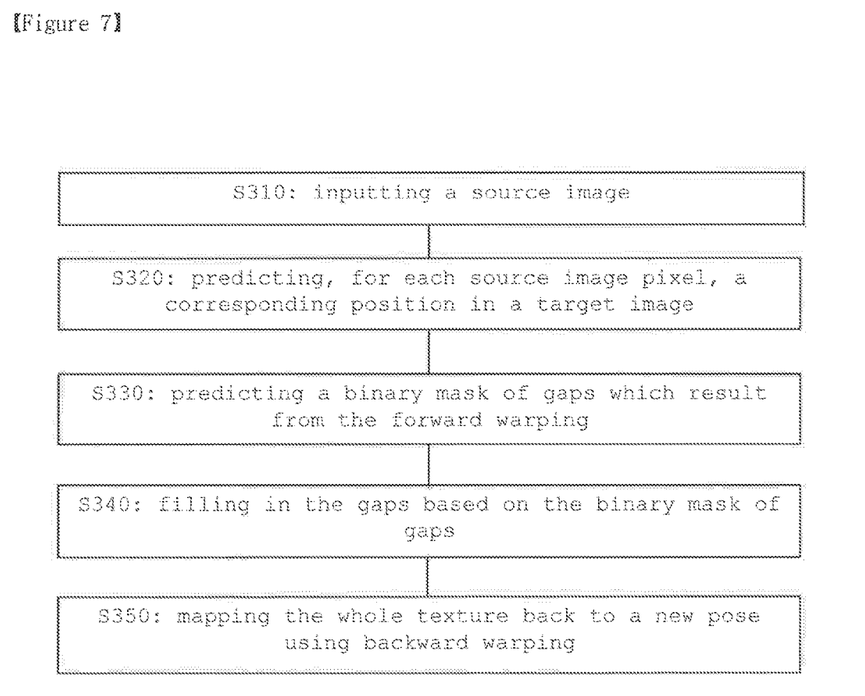
FIG. 7 shows a flowchart of the image resynthesis method according to an embodiment of the present invention.

Referring to FIG. 7, in yet another aspect, the present invention is directed to an image resynthesis method comprising the steps of:

inputting a source image (S310);

predicting, for each source image pixel, a corresponding position in a target image (S320), wherein a forward warping field which is aligned with the source image is predicted;

predicting a binary mask of gaps which result from the forward warping (S330);

filling in the gaps (S340) based on said binary mask of gaps by generating a texture image by means of predicting a pair of coordinates in the source image for each pixel in the texture image; and mapping the whole texture back to a new pose using backward warping (S350).

In an exemplary embodiment, the step of filling in the gaps (340) comprises the steps of:

assigning, to each pixel p=(x,y) of the input image, a pair of texture coordinates (u,v) according to a fixed pre-defined texture mapping, so as to provide a two-channel map of x and y values in the texture coordinate frame;

providing a complete texture map, where for each texture pixel (u,v) a corresponding image pixel (x[u,v],y[u,v]) is known;

generating a final texture by mapping image values from positions (x[u,v],y[u,v]) onto the texture at positions (u,v) so as to provide a complete color final texture;

remapping the final texture to a new view by providing a different mapping from the image pixel coordinates to the texture coordinates.

A computer program product comprising computer program code which, when executed by one or more processors, causes the one or more processors to implement the method according to the previous aspect is also provided. The computer program product may be stored on a non-transitory computer-readable medium.

Figure 1:
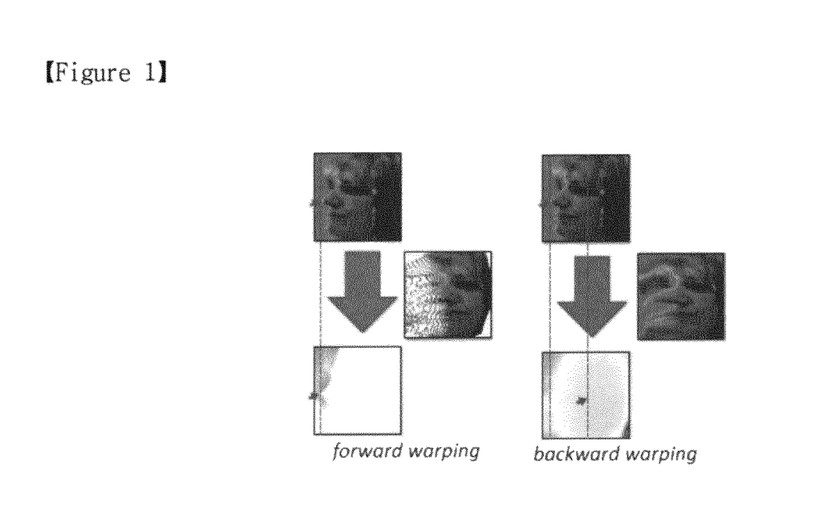
FIG. 1 shows the difference between forward and backward warping explained in terms of face frontalization task.

Referring now to FIG. 1, the difference between forward and backward warping explained in terms of face frontalization task is illustrated. In both schemes, the warping field is predicted (bottom; hue=direction, saturation=magnitude) from the input image (top), and the warping is applied (right). In the case of forward warping, the input image and the predicted field are aligned (e.g., the motion of the tip of the nose is predicted at the position of the tip of the nose). Conversely, in the case of backward warping the input image and the warping field are misaligned. The forward warping methodology in the context of the present invention will now be described in further detail.

A person skilled in the art may readily understand that the methodology described below is adapted to be performed by deep convolutional neural networks which may implement the inventive image resynthesis system elements and image resynthesis method steps as mentioned above. The detailed description of the methodology provided below with reference to mathematical operations and relations between various data elements may rely upon respective functions rather than specific elements of the system or method as outlined above, and in such cases a person skilled in the art may readily derive the connections between said system elements and/or method steps, on the one hand, and the respective functions mentioned below, on the other hand, without the need for strictly limiting the scope of various ways of implementing said functions with a specific connection between each function and corresponding system element and/or method step. System elements and/or method steps implemented by deep convolutional neural networks are intended to be exemplary and non-limiting in the context of implementation of the inventive approach to image resynthesis as described in detail below.

Resynthesis by Forward Warping

Let x be a source image and let y be a target image, and let x[p,q] denote the image entry (sample) at the integer location (p, q) (which can be e.g., an RGB value). Let w[p, q]=(u[p, q], v[p, q]) be a warping field. Often, this warping field will be predicted from x by a convolutional network $f_\theta$, where $\theta$ is a vector of some learnable parameters trained on a certain dataset.

A standard approach to warping based resynthesis of images uses warping to warp the source image x to the target image y:

$$y_{bw}[p,q]=x[p+u[p,q],q+v[p,q]] \quad \text{(1) Equation 1}$$

where sampling at fractional positions is defined bilinearly. More formally, the result of the backward warping is defined as:

$$y_{bw}[p, q] = \sum_{i,j} x[i, j]K(i, j, p + u[p, q], q + v[p, q]), \quad (2)$$

where the bilinear kernel K is defined as follows:

$$K(k,l,m,n)=\max(1-[m-k],0)\max(1-[n-l],0), \quad \text{(3) Equation 3}$$

so that for each (p, q) the summation in (2) is taken over i={⌊p+u[p,q]⌋, ⌈p+u[p,q]⌉} and j={⌊q+v[p,q]⌋, ⌈q+v[p,q]⌉}.

Backward warping methodology was originally implemented for deep image recognition (see e.g., [13]) and was later extensively used for deep image resynthesis (see e.g., [5, 30, 20, 3, 23]), becoming a standard layer within deep learning packages. It was found that, for resynthesis tasks with significant geometric transformations, the use of backward warping layers provided a significant improvement in the quality and generalization ability compared to architectures with resynthesis using convolutional layers alone (see e.g., [3]).

However, backward warping is limited by the lack of alignment between the source image and the warping field. Indeed, as can be seen from expression (1) provided above, the vector (u[p,q], v[p,q]) predicted by the network $f_\theta$ for pixel (p, q) defines the motion for object part that is initially projected onto the pixel (p+u[p,q],q+v[p,q]). For example, let us consider a face frontalization task, where a network is desired to predict the frontalizing warp field given an input image containing a non-frontal face. Assume that the position (p, q) in the initial image corresponds to the tip of the nose, while for the frontalized face the same position corresponds to the center of the right cheek. When backward warping is used for resynthesis, prediction of the network $f_\theta$ for the position (p, q) has to contain the frontalizing motion of the center of the right cheek. At the same time, receptive field of the output network unit at (p, q) in the input image corresponds to the tip of the nose. Thus, the network has to predict the motion of the cheek while observing the appearance of a patch centered on the nose (see FIG. 1). When frontalizing motion is small, such misalignment can be handled by a sufficiently deep convolutional architecture with sufficiently large receptive fields. However, as motions become larger, such mapping becomes progressively harder to learn for a convolutional architecture.

Therefore, forward warping performed by a forward warping module is used in the resynthesis architectures according to the present invention instead of backward warping. Forward warping operation is defined such that the following equality holds approximately for the output image yfw:

$$y_{fw}[p+u[p,q], q+v[p,q]] \approx x[p,q] \quad \text{(4) Equation 4}$$

Thus, in the case of the forward warping, the warp vector at pixel [p, q] defines the motion of this pixel. To implement forward warping, bilinear kernel is used to rasterize source pixels onto the target image in the following way. First, all contributions from all pixels are aggregated using convolutional kernel into the aggregator map a:

$$a[i, j] = \sum_{p,q} x[p, q] K(i, j, p+u[p, q], q+v[p, q]). \quad (5)$$

Simultaneously, the total weight of all contributions to each pixel is accumulated in a separate aggregator w:

$$w[i, j] = \sum_{p,q} K(i, j, p+u[p, q], q+v[p, q]). \quad (6)$$

Finally, the value at pixel is defined by normalizing:

$$y_{fw}[i,j] = a[i,j]/(w[i,j]+\epsilon), \quad \text{(7) Equation 7}$$

where the small constant $\epsilon = 10^{-10}$ prevents numerical instabilities. Formally, for every target position (i, j) the summation in (5) and (6) runs over all source pixels (p, q). However, since for every source pixel (p, q) bilinear kernel K(i,j,p+u[p,q], q+v[p,q]) takes non-zero values at only four positions in the target image, the summations above can be computed efficiently using one pass over the pixels of the source image. Note that similar techniques are used for partial convolutions (see e.g., [17]). As operations (5)-(7) are piecewise-differentiable with respect to both the input image x and the warping field (u, v), one can backpropagate gradients through the forward warping operation during the convolutional network training.

The main advantage of forward warping over backward warping is that the input image and the predicted warping field are aligned in the case of forward warping, as the prediction of the network at pixel (p, q) now corresponds to a two dimensional (2D) motion of the object part which is projected onto (p, q) in the input image. In the frontalization example shown above, the convolutional network has to predict the frontalizing motion of the tip of the nose, based on the receptive field centered on the tip of the nose. This mapping is easier to learn for a convolutional network than in the case of backward warping, and this effect has been experimentally demonstrated.

However, on the downside, in most circumstances the output yfw of the forward-warping operation contains a number of empty pixels, into which no source pixels were mapped. A binary mask of pixels that are non-empty is denoted with m, i.e., m[i,j]=[w[i,j]>0]. The following inpainting stage is then needed to fill in such gaps.

Figure 2:
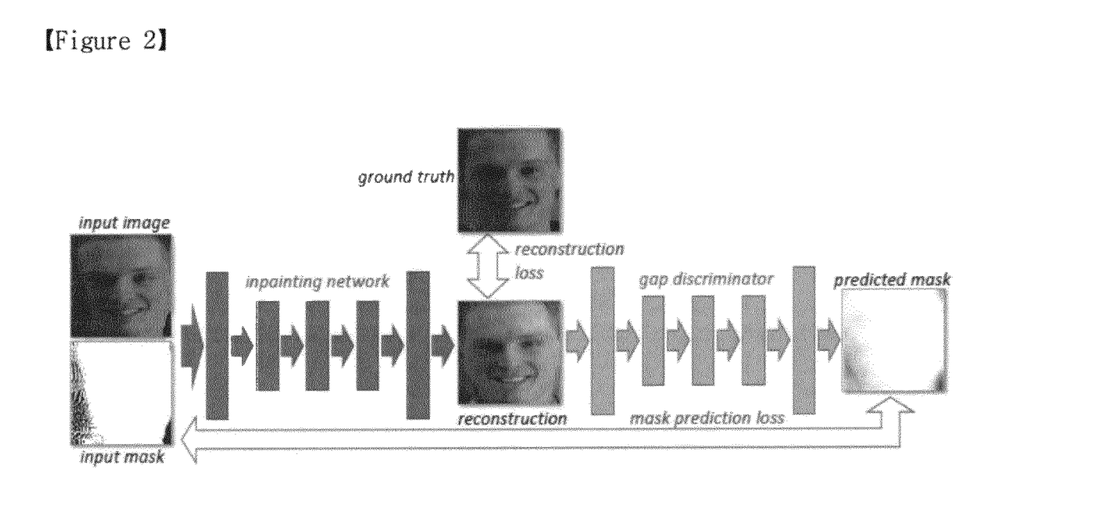
FIG. 2 illustrates the machine learning process for inpainting with gap discriminators according to an embodiment of the present invention.

FIG. 2 illustrates a process of training a neural network to perform gap inpainting with the use of gap discriminators. The present inventors trained an inpainting network to fill in gaps in an input image (where known pixels are specified by a mask) with minimizing the reconstruction loss relative to the "ground truth". In parallel, a segmentation network (also referred to herein as a gap discriminator) was trained to predict the mask from the result of a fill-in operation with minimizing mask prediction loss. The inpainting network was trained adversarially to the gap discriminator network by maximizing the mask prediction loss, which caused the filled-in parts in the reconstructed image be indiscernible from the original parts.

A process of "inpainting" gaps resulting from the previous stage of forward warping will now be described in more detail, by way of illustration but not limitation.

Inpainting with Gap Discriminators

Image completion function $g_\phi$ with learnable parameters $\phi$ maps the image yfw and the mask m to a complete (inpainted) image yinp:

$$y_{inp} = g_\phi(y_{fw}, m). \quad \text{(8) Equation 8}$$

Use of deep networks with gated convolutions to handle inpainting tasks has been experimentally proved efficient in providing good architectures for inpainting gaps resulting from warping in the process of image resynthesis. Irrespective of the architecture of $g_\phi$, the choice of loss function for its learning plays a crucial role. Most often, training $\phi$ is done in a supervised setting, which involves providing a dataset of complete images, designing a random process that occludes parts of those images, and training the network to reverse this random process. Minimization of subsequent loss is then performed at training time:

$$L_{pix}(\phi) = -\sum_i \left\| g_\phi(y_{fw}^i, m^i) - y_{gt}^i \right\|, \quad (9)$$

where i iterates over training examples and $y_{gt}^i$ denotes complete images. The norm in expression (9) can be chosen as an L1 norm (i.e., the sum of absolute differences in each coordinate) or as a more complex perceptual loss based not on differences between pixels but instead on differences between high-level image feature representations extracted from pretrained convolutional neural networks (see e.g., [14]).

When empty pixels form large contiguous gaps, the results of learning with pixelwise or perceptual losses are usually suboptimal and lack plausible large-scale structure due to the inherent multi-modality of the task. The use of adversarial learning (see e.g., [6]) gives a significant boost in this case. Adversarial learning trains a separate classification network $d_\psi$ in parallel with the network $g_\phi$. The training objective for $d_\psi$ is the discrimination between the inpainted and the original (uncorrupted) images:

$$L_{disc}(\psi) = -\sum_i \log d_\psi(y_{gt}^i) + \log(1 - d_\psi(g_\phi(y_{fw}^i, m^i))) \qquad (10)$$

The training objective for a is then augmented with a separate term that measures the probability of the discriminator to classify the inpainted image as the real one:

$$L_{adv}(\phi) = -\sum_i \log d_\psi(g_\phi(y_{fw}^i, m^i)). \qquad (11)$$

Prior art approaches to adversarial inpainting suggest using two discriminators, both based on the same principle but focused on different parts of images. One of these, referred to as global discriminator, is focused on the entire image, while the other one, local discriminator, is focused on the most important part such as the immediate vicinity of the gap or the central part of the face (see e.g., [4]).

Present invention suggests using a different kind of discriminators (referred to herein as gap discriminators) for the gap inpainting tasks. Present inventors found that humans tend to judge the success of inpainting operation by their (in)ability to identify gap regions at an inpainted image. Interestingly, humans do not need to know any sort of the "ground truth" for such judgment. To mimic this idea, the gap discriminator $h_\xi$ is trained to predict a mask m from the inpainted g minimizing the weighted cross-entropy loss for binary segmentation:

$$L_{gap}(\phi, \xi) = \\ -\sum_i \frac{m^i}{|m^i|} \odot \log h_\xi(g_\phi(y_{fw}^i, m^i)) + \frac{1-m^i}{|1-m^i|} \odot \log(1 - h_\xi(g_\phi(y_{fw}^i, m^i))). \qquad (12)$$

Here, (·) denotes elementwise product (summation over all pixels) and |m| denotes the number of non-zero pixels in mask m. As the training of gap discriminator progresses, inpainting network is trained to confuse the gap discriminator by maximizing the same cross-entropy loss (12) (thus playing a zero-sum game). The new loss can be used alongside the "traditional" adversarial loss (11) as well as any other losses. The proposed new loss is applicable to any inpainting/completion problem, not necessarily in conjunction with forward warping.

Learning with incomplete ground truth. In some circumstances, such as texture inpainting tasks, complete ground truth images are not available. Instead, each ground truth image $y_{gt}^i$ comes with a binary mask $m_{gt}^i$ of known pixels. This mask has to be different from the input mask $m^i$ (otherwise, the training process may converge to a trivial identity solution for the inpainting network). In such circumstances, the losses characterized in above expressions (9)-(11) are adapted so that $y^i$ and $g_\phi(y_{fw}^i, m^i)$ are replaced by $y^i \odot m_{gt}^i$ and $g_\phi(y_{fw}^i, m^i) \odot m_{gt}^i$ correspondingly. Interestingly, new adversarial loss does not take into account complete ground truth images. Therefore, even when complete ground truth images are unavailable, the loss characterized in expression (12) above may still be applicable without modification (both for gap discriminator training and as a loss for inpainting network training).

Figure 3:
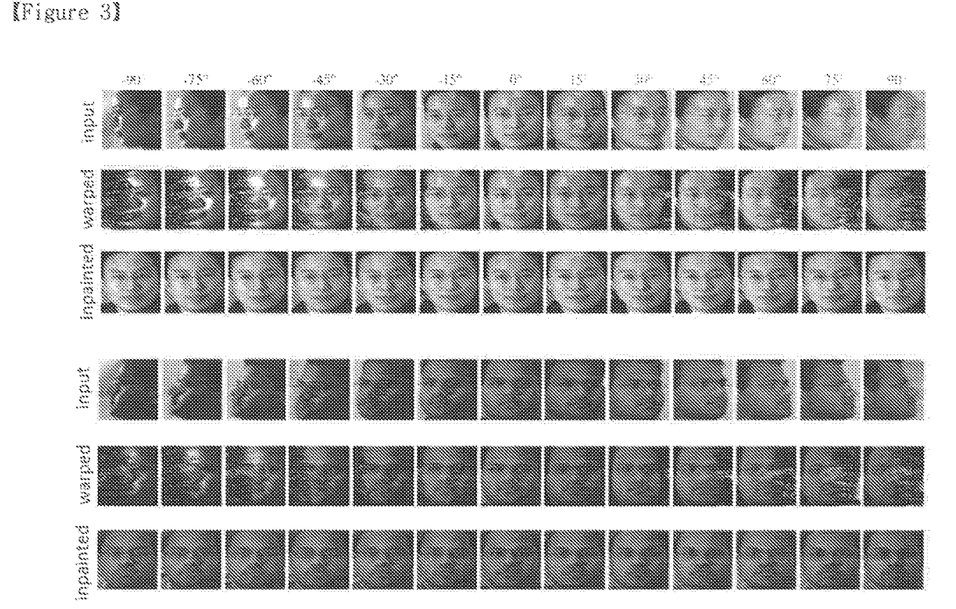
FIG. 3 illustrates the process of face frontalization via forward warping according to an embodiment of the present invention.

FIG. 3 shows an example of face frontalization via forward warping according to at least one embodiment of the present invention. In this example, an algorithm trained on 80% of random samples from a Multi-PIE dataset has been visually assessed based on two randomly picked subjects from validation part. Each input photo (1st row on FIG. 3) is independently passed through a warp field regressor yielding a warped image (2nd row on FIG. 3) and then through an inpainter yielding an inpainted image with gaps filled in and warping errors corrected (3rd row).

Figure 4:
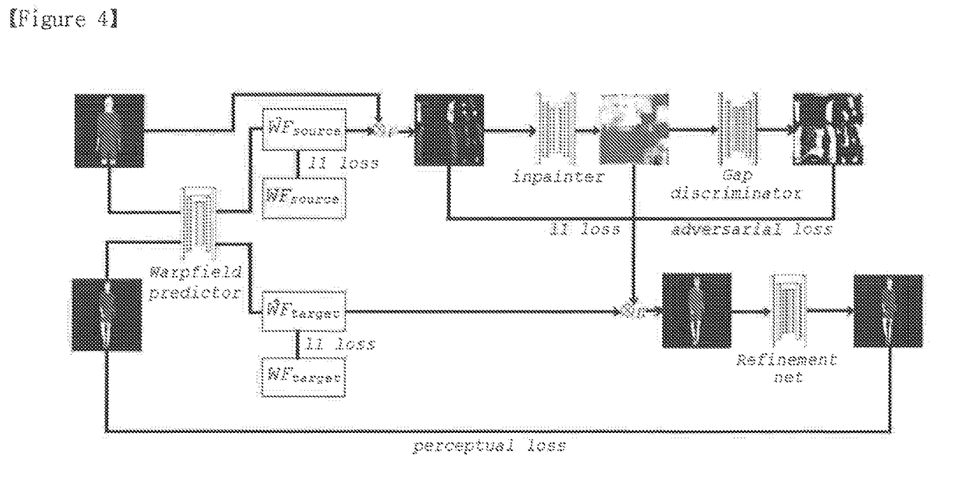
FIG. 4 illustrates a texture transfer architecture according to an embodiment of the present invention.

FIG. 4 illustrates an example of a texture transfer architecture in accordance with at least one embodiment of the present invention. The texture transfer architecture predicts warping fields for both source and target images. Then, having mapped source image into texture space via forward warping, it is restored to a whole texture and then mapped back to a new pose using backward warping, the result of which is then refined. On FIG. 4, 0F and $0_B$ are forward and backward warping respectively, while WF and WF are predicted and ground truth densepose warping fields.

Figure 5:
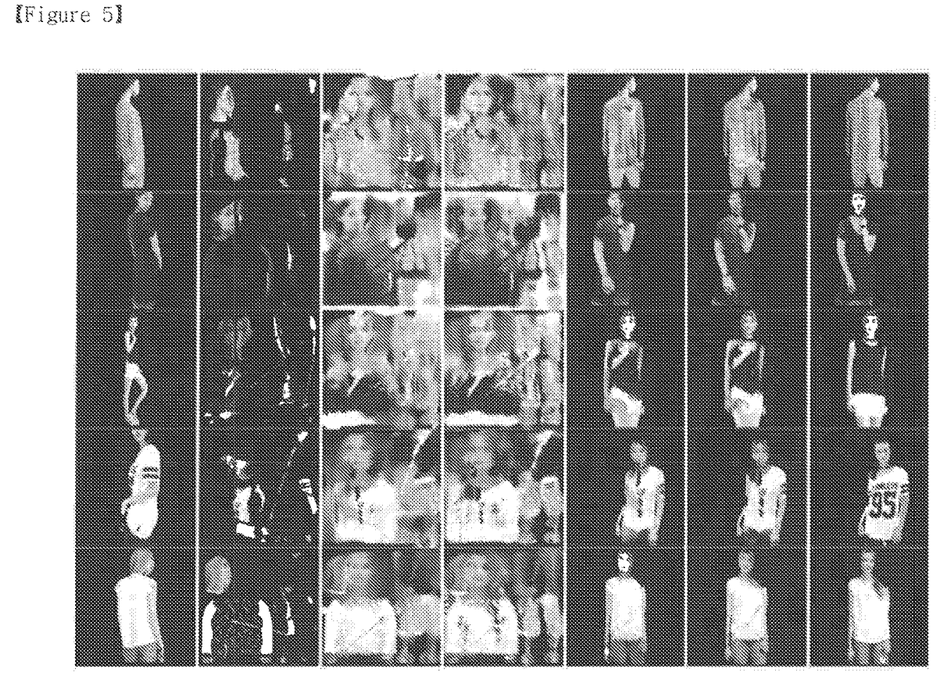
FIG. 5 illustrates the process of texture completion for new pose resynthesis according to an embodiment of the present invention.

FIG. 5 illustrates an example of texture completion for the task of new pose resynthesis in accordance with at least one embodiment of the present invention. A texture is extracted from an input image of a person (first column on FIG. 5). It is then inpainted with a deep convolutional network. The third column of FIG. 5 shows the result of the inpainting with a network trained without a gap discriminator. Adding a gap discriminator (fourth column on FIG. 5) yields sharper and more plausible results in the inpainted areas. Resulting textures are then superimposed onto the image of the person seen in a new pose (columns five and six on FIG. 5, respectively). The last column on FIG. 5 shows the ground truth image for the person in a new pose.

Figure 6:
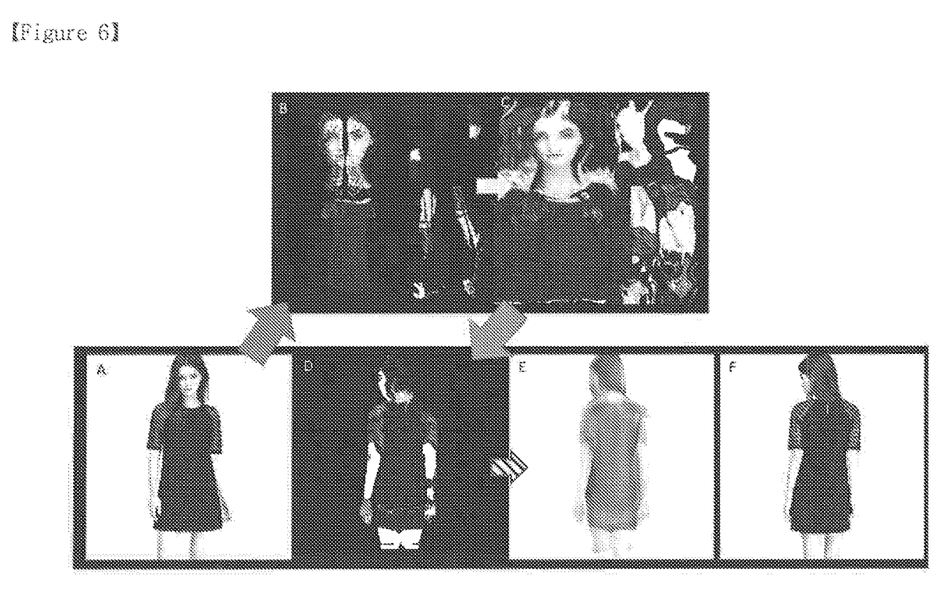
FIG. 6 illustrates the process of full body resynthesis using coordinate-based texture inpainting according to an embodiment of the present invention.

FIG. 6 illustrates an example of full body resynthesis using coordinate-based texture inpainting. Input image A is used to produce a texture image B. Coordinate-based inpainting is applied that predicts coordinates of pixels in the source image for every texture image. The result is shown in image C, where the colors of texture pixels are sampled from the source image at prescribed coordinates. An image of a person in a new pose (target image) is synthesized by taking prescribed texture coordinates for pixels of the target image and transferring colors from the texture (image D). Finally, a separate refinement deep network transforms the image into a new image (image E). Image F shows the true image of the person in the new pose.

End-to-End Training

Since both forward warping and inpainting networks are end-to-end differentiable (i.e. the partial derivatives of any loss function with respect to the parameters of all layers, including layers before the forward warping module and layers with the inpainting network can be computed using backpropagation process), the joint system can be trained (forward warping and inpainting) in an end-to-end fashion, while applying a gap discriminator to attempt to predict gap locations resulting from the forward warping process to the combined network.

Coordinate-Based Inpainting

The goal of coordinate-based inpainting is to complete a texture of e.g., a person depicted in an image, based on parts of said texture extracted from a source image. More specifically, starting from a source image, the following steps are performed:

1. A pre-trained deep neural network is run that assigns, to each pixel p=(x,y) of the input image, a pair of texture coordinates (u,v) according to a fixed pre-defined texture mapping. As a result, a subset of texture pixels are assigned pixel coordinates, resulting in a two-channel map of x and y values in the texture coordinate frame with a large number of texture pixels for which this mapping is unknown.

2. As the next step, a second deep convolutional neural network h with learnable parameters is run such that the x- and y-maps are completed, resulting in a complete texture map, where for each texture pixel (u,v) a corresponding image pixel (x[u,v],y[u,v]) is known.

3. The final texture is obtained by taking the image values (e.g., in red, green and blue channels) at the position (x[u,v],y[u,v]) and putting them onto the texture at position (u,v), resulting in a complete color texture.

4. Once the complete texture is obtained, it is used to texture a new view of a person in a different pose, for which a different mapping from the image pixel coordinates to the texture coordinates is provided.

Parameters may be further optimized so that the sequence of steps 1-4 outlined above produces a close match to the second image in the pair, when the first image of the pair is used to create the texture. Any standard losses (e.g., pixel-wise, perceptual) can be used to measure the closeness. Gap discriminator may be added to the training of the texture completion network.

Finally, a separate refinement network can be used to transform the retextured image obtained as a sequence of steps 1-4 in order to improve the visual quality. This refinement network can be trained separately or jointly with the texture completion network.

Next, provided are certain examples of practical implementation of the inventive approaches by way of illustration but not limitation. The inventive approach based on forward warping followed by an inpainting network trained with gap discriminators is applied to a variety of tasks with different levels of complexity.

Face Frontalization

As a first task, a face frontalization approach is considered, which is intended to warp a non-frontally oriented face into a frontalized one, while preserving the identity, facial expression and the lighting. The method is trained and evaluated on a Multi-PIE dataset which is described e.g., in [7], Multi-PIE dataset being a dataset of more than 750000 upper body images of 337 people imaged over four sessions with varying (and known) views, illumination conditions and facial expressions. U-Net shaped (see e.g., [22]) architecture (N convolutional layers, N for the forward warping, and an hourglass-type architecture for the inpainting networks) is used.

Face and Upper Body Rotation

For face rotation, the inventive methodology was trained and evaluated on Multi-PIE dataset (see e.g., [7]). For each subject, 15 views were taken simultaneously by multiple cameras, 13 of which were placed around the subject at regular intervals of 15°, ranging from −90° to 90°, in the same horizontal plane, and 2 on an elevated level. Each multi-view collection was taken with 19 various illumination conditions, up to 4 sessions and 4 facial expressions. In the experiments, only 13 cameras placed around the subject in the same horizontal plane are used. For the upper body experiments, raw images were used, while for the experiments with faces a MTCNN face detector was used to find a face bounding box and crop it with a gap of 10 pixels. 128×128 was the standard resolution for the experiment, and all images were finally resized to that resolution before passing to the learning algorithm. Frontalization is considered the most important particular case of the rotation task for the experiments.

Suggested image resynthesis pipeline consists of two large parts: a warp field regressor realized in the form of a forward warping module, and an inpainter realized in the form of a gap filling module. A warp field regressor is a convolutional network (ConvNet) $f_\omega$ with trainable parameters $\omega$ which follows a U-Net architecture (see e.g., [22]). Input image (and two additional meshgrid arrays encoding pixels rows and columns) is provided, and the ConvNet produces a field of offsets, encoded by two 2D arrays $w_\delta[p,q]=(u_\delta[p,q], v_\delta[p,q])$. This field is later transformed to a forward warp field by a simple addition $w[p,q]=(u[p,q], v[p,q])$, $v[p,q])=(p+u_\delta[p,q],q+v_\delta[p,q])$ and passed to a forward grid sampler. In the described case, $w_\delta[p,q]$ encodes a motion of a pixel (p,q) on an input image. Note, however, that the same construction could be potentially used to regress a backward warp field, if a backward sampler is further applied.

The second part, the inpainter, is a network $q_\phi$ with learnable parameters $\phi$ also based on U-Net architecture (albeit without skip connections) with all convolutions replaced to gated convolutions. These are the attentive layers first proposed in [28] to efficiently handle difficult inpainting tasks. Employed is a gated convolution as defined in [28]:

$$\text{Gating}=\text{conv}(I, W_g),$$

$$\text{Features}=\text{conv}(I, W_f),$$

$$\text{Output}=\text{ELU}(\text{Features})\cdot\sigma(\text{Gating}) \quad \text{Equation 13}$$

where $I \in \mathbb{R}^{I_h \times I_w \times C}$ is an input image, $W_g$, $W_f \in \mathbb{R}^{K_h \times K_w \times C^a \times C}$ are weight tensors, and $\sigma$ and ELU are sigmoid and Exponential Linear Unit activation functions, respectively. The inpainter receives a warped image with gaps, a gap mask, and meshgrid tensor encoding positions of the pixels, and predicts an inpainted image.

A model is trained in the generative adversarial network (GAN) framework and two discriminator networks are added. The first discriminator, a real/fake discriminator, aims to tell ground truth output images from inpainted images, produced by the generative inpainting network. A real/fake discriminator $d_\psi$ may be organized as a stack of plain and strided convolutions, mostly following the architecture of VGG-16 feature extractor part, and followed by average pooling and a sigmoid. The resulting number indicates the predicted probability of an image being a "real" one. The second discriminator is a gap discriminator $h_\xi$, which aims to recover the gap mask from an inpainted image by solving a segmentation problem. The GAN generator, on the contrary, tries to "fool" the gap discriminator by producing images with inpainted areas indistinguishable from non-inpainted areas.

As mentioned above, end-to-end learning of the pipeline is a difficult task, which requires a careful balance between various loss components. A loss value Lgenerator for a generative ConvNet, which comprises a warp field regressor followed by an inpainter, is optimized as follows:

$$L_{generator}(\omega,\phi)=L_{warping}(\omega)+L_{inpainter}(\theta,\phi)+ \\ \alpha_{adv}L_{adv}(\omega,\phi)+\alpha_{gap}L_{gap}(\omega,\phi), \quad \text{Equation 14}$$

where $L_{warping}(\omega)$ penalizes a warped image and a warp field, and $L_{inpainter}(\omega, \phi)$ only penalizes an inpainted image, $L_{adv}(\omega,\phi)$ and $L_{gap}(\omega, \phi)$ are generator penalties corresponding to the adversarial learning with the first discriminator, the real/fake discriminator, and the second discriminator, the gap discriminator, respectively. Consequently, these components decompose into the following basic loss functions:

$$L_{warping}(\omega) = \alpha_{pix_1} L_{pix_1}(\omega) + \alpha_{smooth} L_{smooth}(\omega) + \alpha_{nonhole} L_{nonhole}(\omega), \quad (15)$$

$$L_{pix_1}(\omega) = \frac{1}{NHW} \sum_i \frac{1}{|m^i|} \left\| m^i \odot (f_\omega(x^i) - y_{gt}^i) \right\|_1,$$

$$L_{smooth}(\omega) = \frac{1}{NHW} \sum_i \sum_{p,q} [\nabla_p^2(w^i)[p,q] + \nabla_q^2(w^i)[p,q]]^{\frac{1}{2}},$$

$$L_{nonhole}(\omega) = \frac{1}{NHW} \sum_i |1 - m^i|,$$

where $((y_{fw}^i, m^i) = x^i \otimes_F w^i$ are the warped image and a non-gap mask obtained by a forward sampler $\otimes_F$, $w^i = f_\omega(x^i)$ is a forward warp field and xi is the i-th input sample. Here and below meshgrid as an input to a warp field regressor and an inpainter is omitted for the sake of clarity $$L_{inpainter}(\omega, \psi) = \alpha_{pix_2} L_{pix_2}(\omega, \psi) + \alpha_{identity} L_{identity}(\omega, \psi), \quad (16)$$

$$L_{pix_2}(\omega, \psi) = \frac{1}{NHW} \sum_i \left\| g_\psi(f_\omega(x^i), m^i) - y_{gt}^i \right\|_1,$$

$$L_{identity}(\omega, \psi) = \frac{1}{NHW} \sum_i \left\| v(g_\psi(f_\omega(x^i), m^i)) - v(y_{gt}^i) \right\|_2,$$

where v is an identity feature extractor. Employed is Light-CNN-29 pretrained on MS-Celeb-1M dataset as a source of identity-invariant embedding. During training, the weights of v are fixed.

$L_{adv}(\omega, \phi)$ follows the expression (11), and $L_{gap}(\omega, \phi)$ is defined similarly:

$$L_{gap}(\omega, \phi) = -\frac{1}{NHW} \sum_i \left\| \frac{1-m^i}{|1-m^i|} \odot \log h_\xi(g_\psi(y_{fw}^i, m^i)) \right\|_1. \quad (17)$$

Together with the generator, both discriminators are updated by the aforementioned losses (10) and (12).

Returning to FIG. 3, performance of the algorithm trained on the subset of Multi-PIE of 80% random samples and evaluated on the remaining 20% of the data is illustrated. The results shown on FIG. 3 correspond to random samples from the validation part.

Body Texture Estimation and Pose Transfer

Forwarding warping and gap discriminator techniques are employed for texture transfer task. DeepFashion dataset (see e.g., [18]) was used to demonstrate performance of the built model that restores the whole texture of a human body which can be projected onto a body of any shape and pose to produce a target image.

The model performs texture transfer in four steps:
1. Map initial image to a texture space and detect its' missing parts
2. Inpaint missing parts to restore the whole texture
3. Project restored texture onto a new body pose
4. Refine resulting image to eliminate defects appeared after texture reprojection.

All modules performing these steps may be trained simultaneously in the end-to-end fashion, although separate loss functions are applied to the outputs of each module. The scheme of the model can be seen on FIG. 5.

24 textures of different body parts placed on a single RGB image are used to predict texture image coordinates for each pixel on the source image for the purpose of mapping input images into a texture space by generating their warping fields. Warping fields for both the source and the target image are generated by the same network with UNet-like architecture. Since warping fields establish a correspondence between initial image and texture space coordinates, it is possible to both generate texture image from photo using forward warping and reconstruct person image from texture using backward warping with the same warping field. In order to train warping field generator used is ground truth uv renders generated by densepose model (see e.g., [8]) and penalize resulting warping fields with L1 (sum of absolute value of differences) loss:

$$L_{warp}(x_{source}, WF, \omega) = \| w_\omega(x_{source}) - WF \|_1 \quad \text{Equation 18}$$

where $x_{source}$ is the source image, WF is ground truth warping field and $w_\omega$ is a warping field generator.

After the source image is mapped into the texture space, resulting texture image has many missing parts (gaps) due to self-occlusions on the source image. These missing parts are then inpainted by the gap filling module which is the second part of the trained model.

The trained model employs gated an hourglass architecture (see e.g., [28]) and a gap discriminator to generate plausible textures along with 11 losses. The loss function for the inpainter looks as follows.

$$L_{inpainter}(t_{source}, t_{target}, \phi, \xi) = \| g_\phi(t_{source}) - t_{source} \|_1 + \| g_\phi(t_{source}) - t_{target} \|_1 + L_{gap}(\phi, \xi), \quad \text{Equation 19}$$

Here tsource and ttarget are the source texture and the target texture, respectively, $g_\phi$ is an inpainter and Lgap is calculated as in expression (12), while weights of gap discriminator are updated with respect to loss function 10.

Once a restored texture is generated, it can be reprojected back onto any body encoded with its warping field. Having a warping field for target image generated by warping field predictor, image of a source person in a target pose can be produced by backward warping the texture with target warping field.

Although a plausible texture reconstruction can be obtained in this way, resulting warped image may have many defects caused by discrepancies observed where different texture parts are connected, as well as some minor body areas missing in the texture space. These problems are difficult to solve in the texture space, however they can be easily tackled in the original image space. For this purpose, an image refinement module, embodied as a refinement network to eliminate these defects may be used. The output of the refinement network is the final result of the model. VGG loss between it and real target image along with a real/fake discriminator that tries to tell between images from dataset and generated ones is calculated:

$$H(t_{source}, x_{target}, \phi, \omega) = g_\phi(t_{source}) \otimes_B w_\omega(x_{target}), L_{refine}(t_{source}, x_{target}, \phi, \omega, \psi) = VGG(H(t_{source}, x_{target}, \phi, \omega), x_{target}) - \log(1 - s_\psi(H(t_{source}, x_{target}, \phi, \omega))), \quad \text{Equation 20}$$

where $\otimes_H$ is backward warping, VGG is a VGG loss, i.e. 12 distance between featured extracted by VGG-16 network and $s_\psi$ is real/fake discriminator, whose loss functions are expressed as follows $$L_{real/fake} = -\log(s_\psi(H(t_{source}, x_{target}, \phi, \omega))) \quad \text{Equation 21}$$

Having now described the one or more machine learning models based on deep convolutional neural networks pretrained or being trained to perform the task of image resynthesis, the inventive image resynthesis system which implements the methodology according to the present invention may be characterized as comprising, in particular:

a source image input module; a forward warping module configured to predict, for each source image pixel, a corresponding position in a target image, the forward warping module being configured to predict a forward warping field which is aligned with the source image; a gap filling module comprising a gap discriminator configured to predict a binary mask of gaps which result from the forward warping, and a gap inpainter configured to fill in the gaps based on said binary mask of gaps by generating a texture image by means of predicting a pair of coordinates in the source image for each pixel in the texture image; and a target image output module.

The forward warping module may further comprise a warp field regressor yielding a forward warped image. The gap filling module as mentioned above may further comprise a warping error correction module configured to correct forward warping errors in the target image.

According to at least one embodiment, the inventive system may further comprise a texture transfer architecture configured to: predict warping fields for the source image and the target image; map the source image into a texture space via forward warping, restore the texture space into a whole texture; and map the whole texture back to a new pose using backward warping.

The system may also further comprise a texture extraction module configured to extract texture(s) from the source image. According to the invention, at least the forward warping module and the gap filling module may be implemented as deep convolutional neural networks. At least one of the deep convolutional networks may be trained using a real/fake discriminator configured to discriminate ground truth images and inpainted images. The gap discriminator of the inventive system may be trained in the form of a separate classification network to discriminate between inpainted and original images by predicting a mask m from the inpainted image by minimizing weighted cross-entropy loss for binary segmentation. The gap inpainter of the inventive system may also comprise: a coordinate assignment module configured to assign, to each pixel p=(x,y) of the input image, a pair of texture coordinates (u,v) according to a fixed pre-defined texture mapping, so as to provide a two-channel map of x and y values in the texture coordinate frame; a texture map completion module configured to provide a complete texture map, where for each texture pixel (u,v) a corresponding image pixel (x[u,v],y[u,v]) is known; a final texture generating module configured to generate a final texture by mapping image values from positions (x[u,v],y[u,v]) onto the texture at positions (u,v) so as to provide a complete color final texture; a final texture remapping module configured to remap the final texture to a new view by providing a different mapping from the image pixel coordinates to the texture coordinates.

In at least one embodiment, the image resynthesis system may comprise an image refinement module configured to correct output image defects caused by discrepancies observed where different texture parts are connected.

It will be apparent for a person skilled in the art that the above-mentioned modules of the inventive system may be implemented by various software, hardware, firmware etc. means which are well known in the art. Various combinations of e.g., hardware and software may be envisaged for performing the functions and/or processing described above, which combinations will be readily apparent for a person skilled in the art from a careful study of the description provided above. The claimed inventions are not limited to any specific forms of implementation or combinations as mentioned above, but may be implemented in various forms depending on the specific image resynthesis task(s) to be resolved.

The preceding is a detailed description of particular exemplary embodiments of the invention, which are intended to illustrate, but not to restrict, the material and technical means which implement the corresponding image processing system components and image processing method steps, their functional properties and relationships therebetween, as well as the mode of operation of the inventive image processing system and method. Other embodiments, which fall within the scope of the present invention, may become apparent for a person skilled in the art after careful reading of the description provided above with reference to the accompanying drawings, and all such apparent modifications, variations and/or equivalent substitutions are deemed encompassed by the scope of the present invention. The order in which the steps of the inventive method are mentioned in the claims does not necessarily define the actual sequence, in which the method steps are intended to be performed, and certain method steps may be performed substantially simultaneously, one after the other or in any appropriate sequence unless otherwise specifically defined and/or stipulated by the context of the present disclosure. Certain method steps may also be carried out once or any other appropriate number of times, although not specified in the claims or elsewhere in the application materials.

It should also be noted that the invention may also take other forms as compared to what is described hereinabove, and certain components, modules, elements, functions may be implemented as software, hardware, firmware, integrated circuits, FPGAs etc. where applicable. The claimed invention or at least specific parts, components, modules or steps thereof may be implemented by a computer program stored on a computer-readable medium, which program, when run on a general purpose computer, GPU, multifunctional device or any suitable image processing device, causes said device to perform some or all steps of the claimed method and/or to control at least some of the components of the claimed image resynthesis system such that they operate in a manner described above. Examples of computer-readable medium suitable for storing said computer program or its code, instructions or computer program elements or modules may include any kind of a non-transitory computer-readable medium which is apparent for a person skilled in the art.

All non-patent prior art references [1]-[30] cited and discussed in this document and listed hereinbelow are hereby included in the present disclosure by reference where applicable.

Further aspects of the invention may occur to a person skilled in the art from the reading of the above description with reference to the drawings. A person skilled in the art will realize that other embodiments of the invention are possible and that the details of the invention can be modified in a number of respects without departing from the inventive concept. Thus, the drawings and description are to be regarded as illustrative in nature and not restrictive. The scope of the claimed invention is determined only by the appended claims.

CITATION LIST

V. Blanz and T. Vetter. Face recognition based on fitting a 3d morphable model. T-PAMI, 25(9):1063-1074, 2003. 2

[2] J. Cao, Y. Hu, B. Yu, R. He, and Z. Sun. Load balanced gans for multi-view face image synthesis. arXiv preprint arXiv:1802.07447, 2018. 2

[3] J. Cao, Y. Hu, H. Zhang, R. He, and Z. Sun. Learning a high fidelity pose invariant model for high-resolution face frontalization. arXiv preprint arXiv:1806.08472, 2018. 1,3

[4] J. Deng, S. Cheng, N. Xue, Y. Zhou, and S. Zafeiriou. Uv-gan: adversarial facial uv map completion for pose-invariant face recognition. In Proc. CVPR, pages 7093-7102, 2018. 1, 2, 4

[5] Y. Ganin, D. Kononenko, D. Sungatullina, and V. Lempitsky. Deepwarp: Photorealistic image resynthesis for gaze manipulation. In European Conference on Computer Vision, pages 311-326. Springer, 2016. 1, 2, 3

I. Goodfellow, J. Pouget-Abadie, M. Mirza, B. Xu, D. Warde-Farley, S. Ozair, A. Courville, and Y. Bengio. Generative adversarial nets. In Advances in neural information processing systems, pages 2672-2680, 2014. 2, 4

[7] R. Gross, I. Matthews, J. Cohn, T. Kanade, and S. Baker. Multi-pie. Image and Vision Computing, 28(5):807-813, 2010. 5

[8] R. A. Guler, N. Neverova, and I. Kokkinos. DensePose: Dense human pose estimation in the wild. In The IEEE Conference on Computer Vision and Pattern Recognition (CVPR), June 2018. 2, 8

[9] Y. Hu, X. Wu, B. Yu, R. He, and Z. Sun. Pose-guided photorealistic face rotation. In Proc. CVPR, 2018. 2

[10] R. Huang, S. Zhang, T. Li, R. He, et al. Beyond face rotation: Global and local perception gan for photorealistic and identity preserving frontal view synthesis. arXiv preprint arXiv:1704.04086, 2017. 2

[11] S. Iizuka, E. Simo-Serra, and H. Ishikawa. Globally and locally consistent image completion. ACM Transactions on Graphics (TOG), 36(4):107, 2017. 1,2

[12] P. Isola, J. Zhu, T. Zhou, and A. A. Efros. Image-to-image translation with conditional adversarial networks. In Proc. CVPR, pages 5967-5976, 2017. 2

[13] M. Jaderberg, K. Simonyan, A. Zisserman, and K. Kavukcuoglu. Spatial transformer networks. In Proc. NIPS, pages 2017-2025, 2015. 1, 2, 3

[14] J. Johnson, A. Alahi, and L. Fei-Fei. Perceptual losses for real-time style transfer and super-resolution. In Proc. ECCV, pages 694-711, 2016. 4

[15] Y. LeCun, B. Boser, J. S. Denker, D. Henderson, R. E. Howard, W. Hubbard, and L. D. Jackel. Backpropagation applied to handwritten zip code recognition. Neural computation, 1(4):541-551, 1989. 1

[16] Y. Li, S. Liu, J. Yang, and M.-H. Yang. Generative face completion. In Proc. CVPR, volume 1, page 3, 2017. 1, 2

G. Liu, F. A. Reda, K. J. Shih, T.-C. Wang, A. Tao, and B. Catanzaro. Image inpainting for irregular holes using partial convolutions. arXiv preprint arXiv:1804.07723, 2018. 1, 2, 3

[18] Z. Liu, P. Luo, S. Qiu, X. Wang, and X. Tang. Deepfashion: Powering robust clothes recognition and retrieval with rich annotations. In Proc. CVPR, pages 1096-1104, 2016. 6

[19] N. Neverova, R. A. Guler, and I. Kokkinos. Dense pose transfer. In The European Conference on Computer Vision (ECCV), September 2018. 2

[20] E. Park, J. Yang, E. Yumer, D. Ceylan, and A. C. Berg. Transformation-grounded image generation network for novel 3d view synthesis. In Proc. CVPR, pages 702-711. IEEE, 2017. 1,3

[21] J. S. Ren, L. Xu, Q. Yan, and W. Sun. Shepard convolutional neural networks. In Proc. NIPS, pages 901-909, 2015. 1, 2

[22] O. Ronneberger, P. Fischer, and T. Brox. U-net: Convolutional networks for biomedical image segmentation. In Proc. MICCAI, pages 234-241. Springer, 2015. 5

[23] A. Siarohin, E. Sangineto, S. Lathuilire, and N. Sebe. Deformable gans for pose-based human image generation. In The IEEE Conference on Computer Vision and Pattern Recognition (CVPR), June 2018. 1, 2, 3

[24] S. Tulyakov, M.-Y. Liu, X. Yang, and J. Kautz. Mocogan: Decomposing motion and content for video generation. In The IEEE Conference on Computer Vision and Pattern Recognition (CVPR), June 2018. 2

[25] J. Uhrig, N. Schneider, L. Schneider, U. Franke, T. Brox, and A. Geiger. Sparsity invariant cnns. In International Conference on 3D Vision (3DV), pages 11-20. IEEE, 2017. 1,2

[26] J. Yim, H. Jung, B. Yoo, C. Choi, D. Park, and J. Kim. Rotating your face using multi-task deep neural network. In Proc. CVPR, pages 676-684, 2015. 2

[27] X. Yin, X. Yu, K. Sohn, X. Liu, and M. Chandraker. Towards large-pose face frontalization in the wild. In Proc. ICCV, pages 1-10, 2017. 2

[28] J. Yu, Z. Lin, J. Yang, X. Shen, X. Lu, and T. S. Huang. Free-form image inpainting with gated convolution. arXiv preprint arXiv:1806.03589, 2018. 1, 2, 5,6, 8

[29] J. Zhao, L. Xiong, P. K. Jayashree, J. Li, F. Zhao, Z. Wang, P. S. Pranata, P. S. Shen, S. Yan, and J. Feng. Dual-agent gans for photorealistic and identity preserving profile face synthesis. In Proc. NIPS, pages 66-76, 2017. 2

[30] T. Zhou, S. Tulsiani, W. Sun, J. Malik, and A. A. Efros. View synthesis by appearance flow. In Proc. ECCV, pages 286-301, 2016. 1, 2, 3.

The invention claimed is:

1. An image resynthesis system comprising:
a source image input circuit;
a forward warping circuit predicting, for each source image pixel of a source image, a corresponding position in a target image, and predicting a forward warping field which is aligned with the source image; and
a gap filling circuit predicting a binary mask of gaps resulting from application of the forward warping circuit and filling in the gaps based on the binary mask by generating a texture image by means of predicting a pair of coordinates in the source image for each pixel in the texture image,
wherein the source image comprises a first view of a person in a first body pose and the target image comprises a second view of the person in a second body pose different from the first body pose.

2. The image resynthesis system of claim 1,
wherein the gap filling circuit comprises a warping error correction circuit correcting forward warping errors in the target image.

3. The image resynthesis system of claim 1, further comprising:
a texture transfer architecture predicting warping fields for the source image and the target image, mapping the source image into a texture space via forward warping, restoring the texture space into a whole texture, and mapping the whole texture back to a new pose using backward warping.

4. The image resynthesis system of claim 1, further comprising:
   a texture extraction circuit extracting texture from the source image.

5. The image resynthesis system of claim 1, wherein at least the forward warping circuit and the gap filling circuit are implemented as deep convolutional neural networks.

6. The image resynthesis system of claim 4, further comprising:
   an image refinement circuit correcting output image defects.

7. The image resynthesis system of claim 5, wherein at least one of the deep convolutional neural networks is trained using a real/fake discriminator discriminating ground truth images and inpainted images.

8. The image resynthesis system of claim 1,
   wherein the gap filling circuit comprises a gap inpainter, and
   wherein the gap inpainter comprises:
      a coordinate assignment circuit assigning, to each pixel p=(x,y) of the source image, a pair of texture coordinates (u,v) according to a fixed pre-defined texture mapping, so as to provide a two-channel map of x and y values in a texture coordinate frame;
      a texture map completion circuit providing a complete texture map, where for each texture pixel (u,v) a corresponding image pixel (x[u,v],y[u,v]) is known;
      a final texture generating circuit generating a final texture by mapping image values from positions (x[u,v],y[u,v]) onto texture at positions (u,v) so as to provide a complete color final texture; and
      a final texture remapping circuit remapping the final texture to a new view by providing a different mapping from image pixel coordinates to the pair of texture coordinates.

9. The image resynthesis system of claim 1,
   wherein the target image comprises an image resynthesis synthesizing a new view of the person based on one image, and
   wherein the one image is the source image.

10. The image resynthesis system of claim 1,
    wherein an image of the second body pose is synthesized by taking prescribed texture coordinates for pixels of the target image and transferring colors from a texture image, and
    wherein the second body pose comprises a new pose.

* * * * *